US010785914B2

(12) United States Patent
Treffer et al.

(10) Patent No.: US 10,785,914 B2
(45) Date of Patent: Sep. 29, 2020

(54) AUTOMATIC CONTROL OF WINDROWER SWATHBOARD

(71) Applicant: AGCO Corporation, Duluth, GA (US)

(72) Inventors: Douglas R. Treffer, Newton, KS (US); Brendon C. Nafziger, Canton, KS (US); Dane Austin Mosel, Hesston, KS (US); Mark M. Glade, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 276 days.

(21) Appl. No.: 16/037,440

(22) Filed: Jul. 17, 2018

(65) Prior Publication Data

US 2019/0021229 A1 Jan. 24, 2019

Related U.S. Application Data

(60) Provisional application No. 62/535,986, filed on Jul. 24, 2017.

(51) Int. Cl.
*A01D 57/26* (2006.01)
*A01D 82/00* (2006.01)
*A01D 57/16* (2006.01)

(52) U.S. Cl.
CPC ............. *A01D 57/16* (2013.01); *A01D 57/26* (2013.01)

(58) Field of Classification Search
CPC ........ A01D 57/00; A01D 57/16; A01D 57/26; A01D 34/667; A01D 82/00; A01D 43/04; A01D 43/077; A01D 57/20; A01D 57/28; A01D 57/30; A01D 34/668
USPC .................................. 56/10.2 R, 16.4 A, 192
See application file for complete search history.

(56) References Cited

U.S. PATENT DOCUMENTS

| 5,778,647 | A | 7/1998 | McLean et al. |
| 5,930,988 | A | 8/1999 | Hanson |
| 9,769,986 | B2 | 9/2017 | Rotole |
| 2006/0123764 | A1 | 6/2006 | McLean et al. |
| 2009/0313964 | A1 | 12/2009 | McLean et al. |
| 2016/0014963 | A1 | 1/2016 | Totten et al. |
| 2017/0280627 | A1 | 10/2017 | Treffer et al. |

FOREIGN PATENT DOCUMENTS

WO 2016/105457 A2 6/2016

OTHER PUBLICATIONS

UK Intellectual Property Office, International Search Report for related UK Application No. 1712703.6, dated Jan. 25, 2018.

*Primary Examiner* — Robert E Pezzuto (57) ABSTRACT

In one embodiment, a swathboard control system, comprising: a header comprising fore and aft a cutting assembly and a conditioning system; a forming shield assembly; a swathboard located between the conditioning system and the forming shield assembly, the swathboard pivotably adjustable about a transverse axis; a position sensor configured to sense a position of the swathboard; and a computing system operably coupled to the position sensor, the computing system configured to provide an indication of the position of the swathboard based on feedback from the position sensor.

20 Claims, 8 Drawing Sheets

AUTOMATIC CONTROL OF WINDROWER SWATHBOARD

CROSS REFERENCE TO RELATED APPLICATION

This application claims the benefit of U.S. Provisional Application No. 62/535,986 filed Jul. 24, 2017, which is hereby incorporated by reference in its entirety.

TECHNICAL FIELD

The present disclosure is generally related to harvesting machines and, more particularly, feedback and/or control of harvesting machine components.

BACKGROUND

Harvesting machines, such as windrowers, are equipped with one of several types of detachable headers having a cutter assembly (e.g., rotary or sickle-type) and a conditioning system, which may include one or more pairs of hydraulically-driven, oppositely rotating, conditioner rolls that are used to condition (e.g., crush, macerate) harvested crop material and deposit the conditioned crop material onto the ground as a swath or windrow. The conditioning process serves to facilitate drying of the crop material. Two components of the windrower that help define the width and/or shape of the windrow are a transverse extending swathboard and a tapered, fore and aft extending forming shield assembly. The swathboard, an example of which is described in commonly assigned U.S. Pat. No. 5,930,988 and incorporated herein by reference in its entirety, is pivotable about a transverse axis and serves as an initial impact point for the crop material discharged from the conditioner rolls. The angle of the swathboard determines if or where along the length of the forming shield assembly the crop material impacts the forming shield assembly. At two extreme swathboard position placements, if the swathboard is angled in a manner to prevent the crop material from impacting the forming shield assembly, the crop material is discharged directly from the swathboard to the ground, resulting in a wide swath. At the other extreme, if the swathboard is angled in a manner to permit the crop material discharged from the conditioner rolls to impact the forming shield assembly, a narrower windrow results from the deposit of the crop material from the forming shield assembly. Adjustments of the swathboard, such as according to the control described in U.S. Pat. No. 5,930,099, may enable a variation of the windrow width and/or shape at or between these two extremes. However, improvements in swathboard operations to improve harvesting operations and/or reduce operator intervention is desired.

BRIEF DESCRIPTION OF THE DRAWINGS

Many aspects of certain embodiments of the disclosure can be better understood with reference to the following drawings. The components in the drawings are not necessarily to scale, emphasis instead being placed upon clearly illustrating the principles of the present systems and methods. Moreover, in the drawings, like reference numerals designate corresponding parts throughout the several views.

DESCRIPTION OF EXAMPLE EMBODIMENTS

Overview

In one embodiment, a swathboard control system, comprising: a header comprising fore and aft a cutting assembly and a conditioning system; a forming shield assembly; a swathboard located between the conditioning system and the forming shield assembly, the swathboard pivotably adjustable about a transverse axis; a position sensor configured to sense a position of the swathboard; and a computing system operably coupled to the position sensor, the computing system configured to provide an indication of the position of the swathboard based on feedback from the position sensor.

DETAILED DESCRIPTION

Certain embodiments of a swathboard control system are disclosed that provide feedback to an operator about swathboard positioning for a harvesting machine (e.g., windrower, including coupled header) are disclosed. In some embodiments, the swathboard control system automatically controls a position of a swathboard based on real-time feedback of the swathboard position and in some embodiments, header tilt information. In one embodiment, the harvesting machine is a self-propelled windrower with a swathboard and a forming shield assembly. A position sensor is used to directly or indirectly sense the position of the swathboard and communicate the sensed position to a computing system for provision of the sensed position. For instance, the computing system may provide the sensed position to a user interface that, in one embodiment, presents feedback to the operator of the windrower about the angular position of the swathboard. In some embodiments, the computing system additionally receives header tilt information, which in combination with the sensed position of the swathboard, enables the computing system to automatically adjust, via an actuator coupled to the swathboard, the swathboard position to control the discharge impact point of the crop material from conditioner rolls of the windrower, maintaining a consistent windrow width and/or more uniform windrow shape.

Digressing briefly, current swathboard designs require the use of mechanical stops to control a position of the swathboard, and an operator has to guess at the position of the swathboard as the operator manipulates the windrower to harvest crops in a field. Further, when an operator changes a tilt of the header, the swathboard also changes its angular position (e.g., due to its connection to the header), which changes windrow formation. In contrast, certain embodiments of a swathboard control system sense a position of the swathboard, and uses this information in some embodiments to provide a representation of the position to the operator. In some embodiments, a swathboard control system automatically adjusts the swathboard angle as the header tilt angle is changed, enabling a consistent windrow width/shape regardless of varying crop and/or terrain conditions.

Having summarized certain features of a swathboard control system of the present disclosure, reference will now be made in detail to the description of a swathboard control system as illustrated in the drawings. While an example swathboard control system will be described in connection with these drawings, there is no intent to limit it to the embodiment or embodiments disclosed herein. For instance, though emphasis is placed on a self-propelled windrower, certain embodiments of a swathboard control system may be beneficially deployed in pull-type windrowers or other harvesting machines that use a swathboard and a forming shield assembly. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the windrower looking forwardly.

Figure 1:
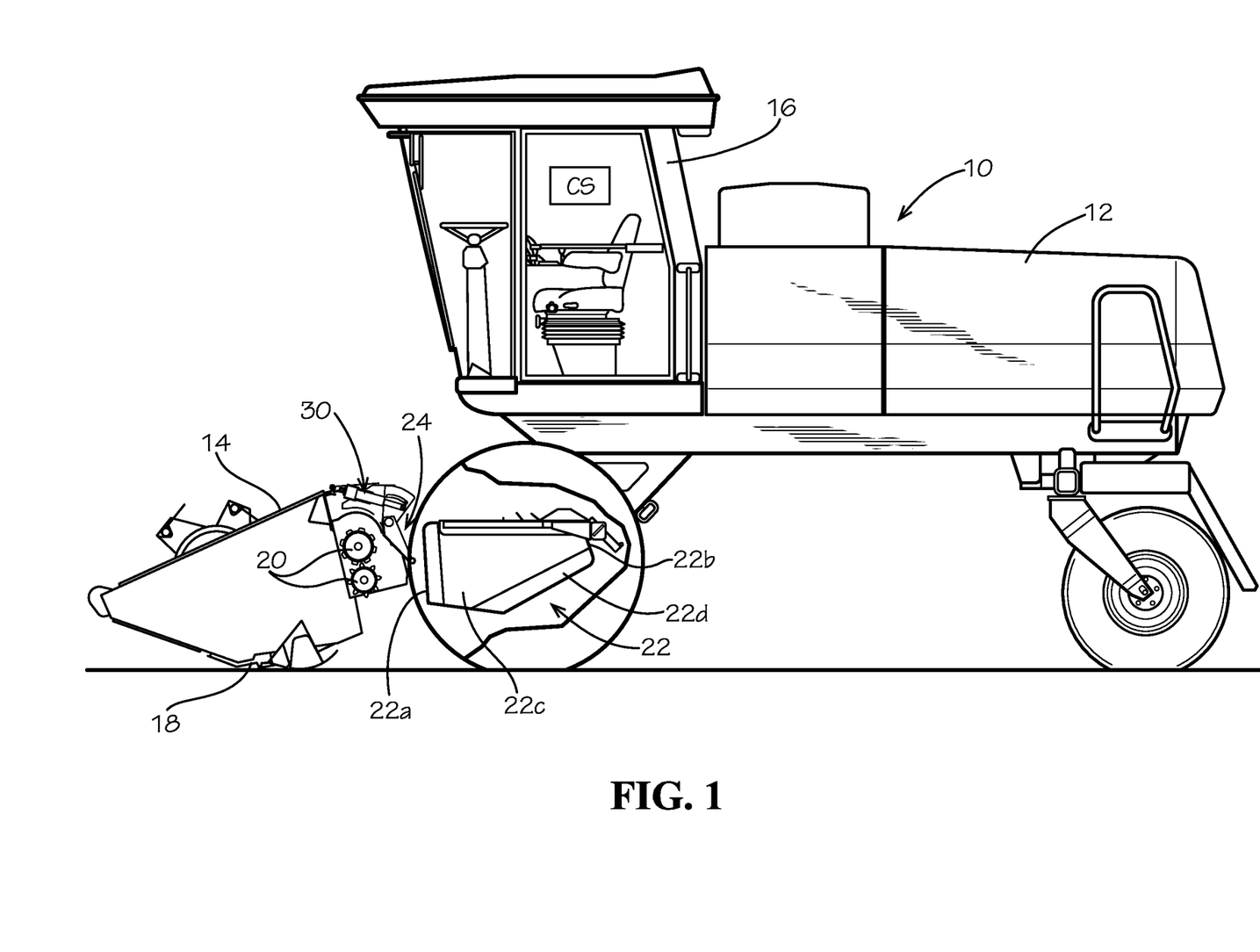
FIG. 1 is a schematic diagram that illustrates, in side elevation view, an example harvesting machine in which an embodiment of a swathboard control system may be implemented.

Referring now to FIG. 1, shown is example harvesting machine in which an embodiment of a swathboard control system may be implemented. In the depicted embodiment, the harvesting machine comprises a self-propelled windrower 10, though in some embodiments, pull-type or other types of harvesting machines may be used. The windrower 10 broadly comprises a self-propelled tractor 12 and a harvesting header 14 attached to the front of the tractor 12. The operator drives the windrower 10 from a cab 16, which includes an operator station comprising a tractor seat and one or more user interfaces (e.g., FNR joystick, display monitor, switches, buttons, etc.) that enable the operator to control various functions of the tractor 12 and header 14. In one embodiment, a computing system (denoted "CS" in FIG. 1 and described further below) is disposed in the cab 16, though in some embodiments, the computing system may be located elsewhere or comprise a distributed architecture having plural computing devices, coupled to one another in a network, throughout various locations within the tractor 12 (or in some embodiments, located in part externally and in remote communication with one or more local computing devices).

The header 14 includes a cutter 18 for severing standing crops as the windrower 10 moves through the field, a conditioning system that, in the depicted embodiment, comprises one or more pairs of conditioner rolls 20, a forming shield assembly, which (as shown in partial cut-away view) in the depicted embodiment, comprises a pair of rearwardly converging windrow forming shields 22 located behind the conditioner rolls 20, and a swathboard 24 located between the conditioner rolls 20 and the forming shields 22. In some embodiments, the conditioning system may be of a different design, including the use of a flail type conditioning system. In self-propelled harvesters, the forming shields 22 are typically supported partly by the header frame and partly by the tractor 12, while in pull-type harvesters the forming shields are typically carried on the header frame only. In some embodiments, the forming shield assembly may be differently configured (e.g., using a single shield or additional shields of the same or different geometric configuration), as long as the result is providing the windrow according to a defined width/shape.

The conditioner rolls 20, depicted in FIG. 1 as a single pair (though an additional pair may be used in some embodiments), have the characteristic of projecting a stream of conditioned materials rearwardly therefrom and toward the forming shields 22 and swathboard 24 as the crop materials issue from the rolls 20. If the swathboard 24 is fully raised, the stream bypasses the swathboard 24 and is acted upon by the shields 22 to form a windrow in accordance with the adjusted positions of the forming shields 22. On the other hand, if the swathboard 24 is fully lowered, as illustrated in FIG. 1, the stream will be intercepted by the swathboard 24 and directed down to the ground without ever engaging the forming shields 22. Consequently, a wide swath will be formed.

Figure 2A:
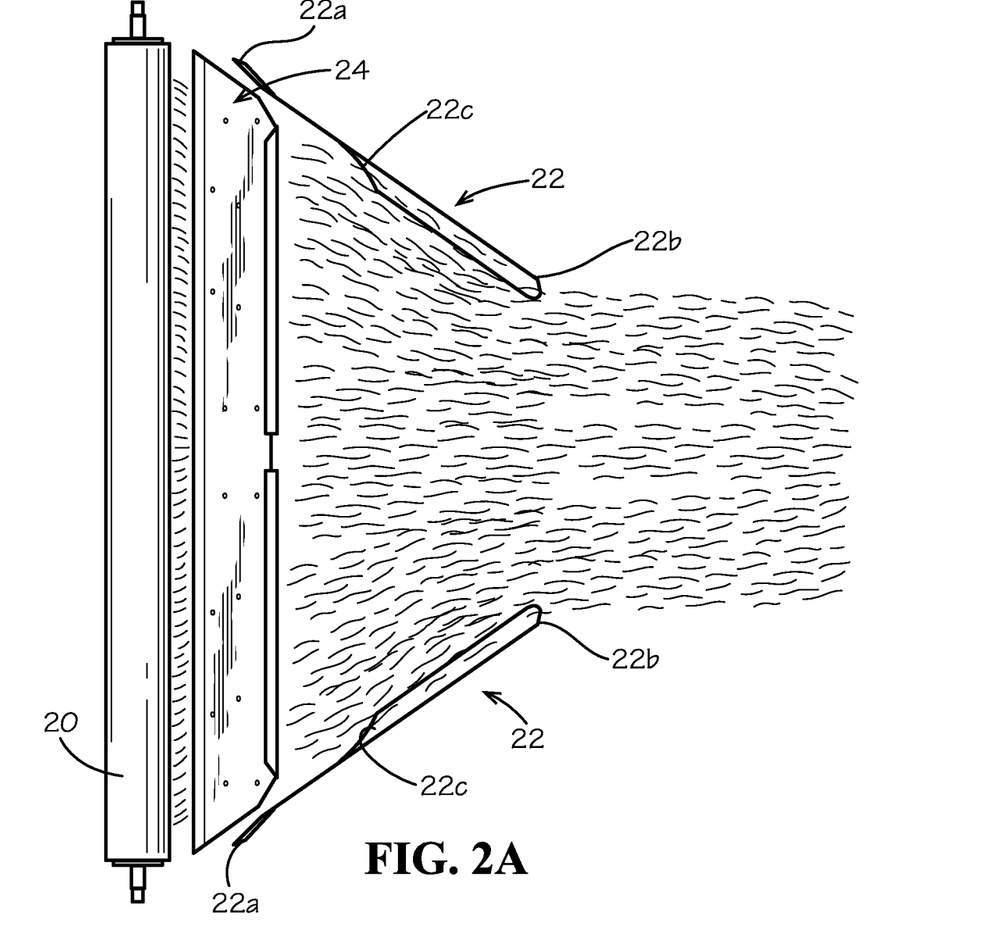
FIGS. 2A-2B are schematic diagrams that illustrate, in fragmentary top plan and side elevation views, respectively, a swathboard and forming shield assembly of the harvesting machine that operate at least in part under control of an embodiment of a swathboard control system.
Figure 2B:
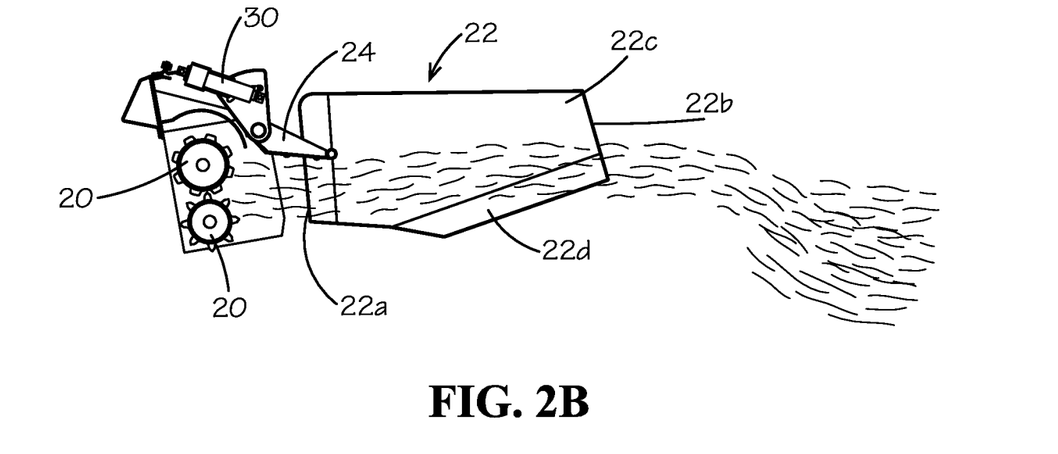

With continued reference to FIG. 1, and referring to FIGS. 2A and 2B, each of the forming shields 22 has a front end 22a, a rear end 22b, and an elongated deflecting surface 22c extending between the front and rear ends 22a and 22b. The front ends 22a of the shields 22 are spaced apart by a distance that substantially corresponds to the width of the conditioner rolls 20 in a direction extending transversely to the path of travel of the windrower 10, while the rear ends 22b of the shields 22 are spaced apart by a distance that is substantially less than such width. Consequently, it will be appreciated that the shields 22 converge rearwardly (e.g., tapered), somewhat in the nature of a funnel to correspondingly taper down the stream of crop materials issuing from the conditioner rolls 20 and impinging upon the shields 22. In one embodiment, the front ends 22a of the shields 22 flare outwardly to a slight extent, while the lower rear margins 22d of the shields 22 are curled slightly inwardly, though other configurations may be used.

As is known, the shields 22 are supported by a frame that includes a pair of fore-and-aft, rearwardly converging members and a top wall (the known member and top wall structures omitted in this view). The shields 22 are pivoted at their front ends 22a to the members by pivots and are adjustably supported by the top wall near their rear ends 22b by releasable fasteners. The fasteners pass through intersecting slots in the top wall and the forming shields 22 respectively.

Figure 3:
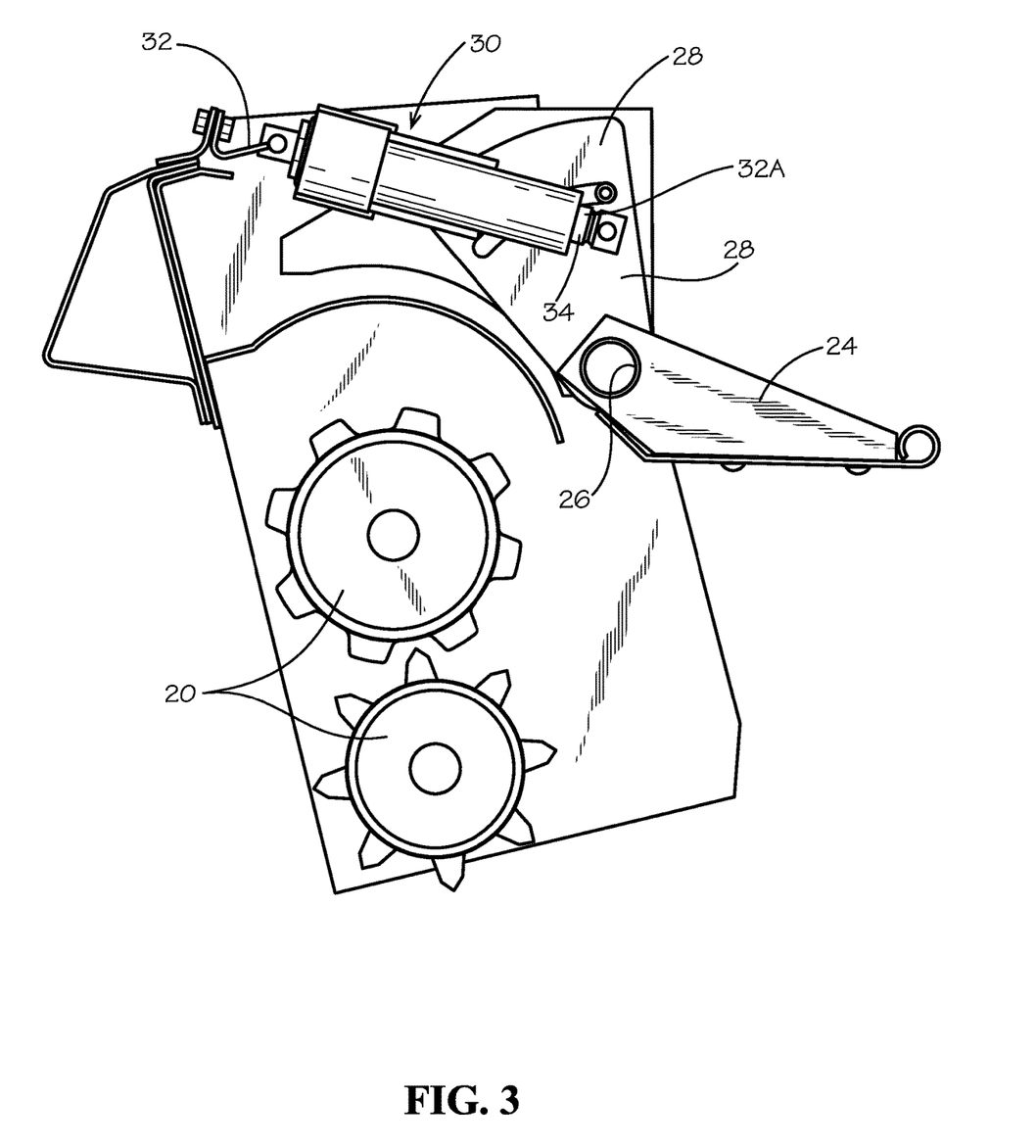
FIG. 3 is a schematic diagram that illustrates in fragmentary, vertical cross-sectional view an actuator and swathboard arrangement that operate under control of an embodiment of a swathboard control system.

With continued reference to FIGS. 1-2B, attention is now directed to FIG. 3, which depicts the swathboard 24 fixed to a transversely extending tube 26. A crank 28 is fixed to the tube 26 and projects upwardly therefrom for rotating the crank 28 and thus the swathboard 24 between the fully raised position of FIG. 3 and the fully lowered position of FIG. 1. In one embodiment, an actuator 30 in the form of an electromechanical device is operably connected between the crank 28 and a mounting lug 32 on the frame of the header 14. The actuator 30 contains a small, reversible electric motor which drives a worm gear (not shown) to extend and retract a moving component (e.g., the rod 32a) of the actuator. Though described in the context of an electrical/electromechanical actuator, the actuator 30 may be configured according to other linear or rotary technologies in some embodiments, including hydraulic, pneumatic, magnetic, and electromagnetic. Additional information about the known structures of the swathboard 24 and an example forming shield assembly may be found in commonly assigned, U.S. Pat. No. 5,930,988, which is incorporated by reference in its entirety.

One embodiment of a swathboard control system comprises the computing system and a position sensor 34. The computing system provides (e.g., to a user interface, storage, or other device or software located internally or externally to the windrower 10) an indication of the swathboard position based on feedback from the position sensor 34. The position sensor 34 is used to sense the position of the swathboard 24 and communicate (e.g., wirelessly or over a wired connection) signals to the computing system. Based on the feedback from the position sensor 34, the computing system provides an indication of the sensed position to, for instance, a user interface for presentation, to the operator, of a value corresponding to the position (e.g., angle, an index value corresponding to the angle, the windrow width, etc.). In one embodiment, the position sensor 34 may be integral to, or attached to, the actuator 30. For instance, the position sensor 34 may indirectly determine the swathboard position by detecting a position or change in position of a moving component (e.g., rod) of the actuator 30, including sensing the amount of stroke of a rod of the actuator 30. In one embodiment, based on access to a data structure (e.g., look up table) associating rod stroke to swathboard position, the computing system determines the position of the swathboard and provides feedback to an operator of that position. In some embodiments, the association of stroke length to swathboard position may be achieved via the computing system computing an equation that associates these changes in variables of the stroke change to the swathboard position. The position sensor 34 may be configured as any one of a plurality of different contact-type sensors, including a rotary encoder, piezoelectric, Hall effect, potentiometer, capacitive, or other type of sensor. In some embodiments, the position sensor 34 may be located elsewhere and/or be based on a non-contact type technology. For instance, the position sensor 34 may use electromagnetic (e.g., optical or acoustic) technology to detect the stroke of the rod for indirect sensing, or be configured for direct sensing using any of the aforementioned technologies by being positioned in a manner to sense directly the position of the swathboard relative to a known datum point (e.g., change in position from one of the extreme positions of the swathboard 24 or a reference located on a component or frame of the windrower 10). For instance, the position sensor 34 may comprise an angle sensor, proximity sensor, etc. Though described using a single position sensor 34, some embodiments may use plural position sensors 34, for instance for redundancy, bolstering accuracy, etc. Feedback of the position of the swathboard 24 enables information about the mechanisms of windrow formation to be conveyed to the operator. For instance, the operator may be presented with an angle of the swathboard 24, and based on observation of the windrows formed while traversing a field, the operator can make well-informed, objective decisions on current or future swathboard adjustments based on performance at those particular angular settings. In some embodiments, the angles may be replaced with index values corresponding to the angular positions to facilitate a simpler, user-friendly feedback of swathboard positioning, or in some embodiments, the information conveyed to the operator may be in the form of windrow width (that is associated with the angle based on current and historical harvesting and optionally environmental information). The presentation to the operator may be achieved via a user interface (e.g., any one or a combination of display screen, microphone/speaker, headset, including use of virtual or augmented reality based technology). In some embodiments, the sensed angular position (or the like) may be recorded as a setting along with environmental and/or crop condition parameters like humidity, temperature, time of year, crop height, crop type, field, etc., wherein the computing system automatically adjusts the swathboard position via the actuator 30 when the operator maneuvers the windrower 10 onto the field based on these recorded parameters.

In some embodiments, the computing system controls the actuator 30 to adjust the swathboard position based on feedback from the position sensor 34 and information about header tilt. For instance, the computing system receives feedback from the position sensor 34 and information about header tilt, and communicates a signal or signals to the actuator 30 to enable control of the swathboard position based on the sensed positions of the swathboard and the header tilt information. As is known, header tilt is achieved by an operator manually activating a switch in the cab 16, which in turn causes activation of one or more control valves of a manifold to change the flow of hydraulic fluid through a (e.g., double-acting) hydraulic cylinder used to cause a tilt of the header 14. An operator may use the tilt function from time-to-time during harvesting operations to avoid obstacles (e.g., gopher mounds) in the field and/or to improve the harvesting action of the header 14 (e.g., when rain or winds have depressed crop material, requiring the tilt to lift the depressed crop material to improve the cutting action). In one embodiment, the computing system receives sensor feedback of the hydraulic cylinder stroke action in similar manner to the sensing performed for the swathboard sensing, or in some embodiments, the switch activation and header tilt have a pre-programmed association that the computing system accesses to known the amount of tilt (e.g., in angle or a corresponding index value). In some embodiments, a separate controller responsible for header tilt control communicates the header tilt information to the computing system (e.g., over a shared network).

One shortcoming to conventional windrowers is that the header tilt causes a change in the impact point of the crop material with the ground or forming shields 22 caused by the swathboard, due in part to the fact that the swathboard angle relative to ground changes as the header 14 is tilted, whereas the angle of the swathboard relative to the header 14 remains constant. Accordingly, when the swathboard is positioned to cause a wider swath (e.g., as shown in FIG. 1), tilts in the header 14 cause the discharge of the crop material from the conditioner rolls 20 to possibly impact the forming shields 22 rather than avoiding the shields 22, resulting in a narrower windrow than anticipated. On the other hand, for positions of the swathboard 24 intended to cause the crop material to impact the forming shields 22 (e.g., FIG. 3), tilts in the header 14 may lead to unintended consequences due in part to the fact that the forming shield assembly is hingeably coupled to the header 14 whereas the angle between the swathboard 24 and the header 14 remains constant. For instance, tilts in the header 14 may cause the crop material to impact the forming shields 22 more forwardly along the shields 22, resulting in a wider windrow than anticipated, or result in a discharge that has non-linear effects due to a transition between impact directly to the ground and impact onto the shields 22. For instance, at the moment when an angular tilt of the header 14 causes the crop material to transition from being deposited directly to the field from the swathboard 24 to hitting the shields 22, the result may be an abrupt narrowing of the windrow and/or an increase in height of the windrow due to the fact, in some instances, that a top portion of the crop discharge envelope may be hitting the forming shield 22 and a bottom portion of the envelope is not hitting the forming shield 22.

To avoid these undesirable effects and improve the consistency of the width and/or shape of the windrow, certain embodiments of a swathboard control system use the sensed position and header tilt information to help maintain a constant, or substantially constant, swathboard position in an absolute coordinate system. To help visualize the principle underlying embodiments of a swathboard control system, attention is first directed to FIGS. 4A-4C, which conceptually illustrate control of positioning of the swathboard with respect to the ground in an embodiment of a swathboard control system, and in particular, the attempt at maintain the swathboard position in an absolute coordinate system as constant. That is, in FIGS. 4A-4C (and FIGS. 5A-5C), there are two coordinate systems that are reflected by the diagrams, including the geometrical configuration of a swathboard 38 relative to ground 40 (an absolute coordinate system, represented by $\beta$) and the geometrical configuration of the swathboard 39 relative to the header 36 (a local coordinate system, represented by $\gamma$). Also shown is an angle, $\alpha$, which is the header (e.g., tilt) angle and is adjusted by the operator to meet field conditions. In conventional system operation, when the header 36 is tilted, the swathboard 38 moves in the absolute coordinate system (since it is connected to the header 36), but does not move at all in the local coordinate system. An objective of certain embodiments of a swathboard control system is to control the swathboard 38 to remain stationary (or substantially stationary) within the absolute coordinate system by making adjustments in the local coordinate system. Stated otherwise, and using FIGS. 4A-4C, it is desirable that this angle, $\beta$, remain constant for varying values of $\alpha$. Without the implementation of an embodiment of a swathboard control system, $\beta$ changes as header tilt, $\alpha$, is varied. The angle, $\gamma$, is the angle of the swathboard 38 relative to the header 36, and can be varied by the operator to adjust the width/shape of the windrow. Without the implementation of an embodiment of a swathboard control system, $\gamma$ remains constant with varying values of $\alpha$. In general, certain embodiments of a swathboard control system, using the computing system operating in conjunction with the actuator 30 and the position sensor 34 and utilizing header tilt angle information, change $\gamma$ as $\alpha$ is changed according to the limits of the machine geometry, which results in $\beta$ being maintained as constant as possible (by maintaining the position of the swathboard 38 constant in the absolute coordinate system).

Figure 4A:
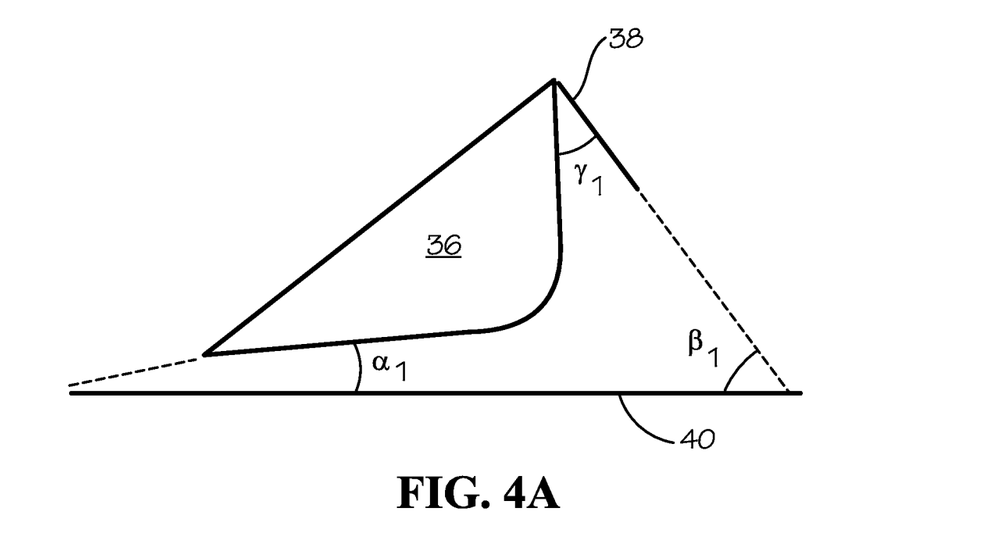
FIGS. 4A-4C are schematic diagrams that conceptually illustrate control of positioning of the swathboard with respect to the ground in an embodiment of a swathboard control system.
Figure 4B:
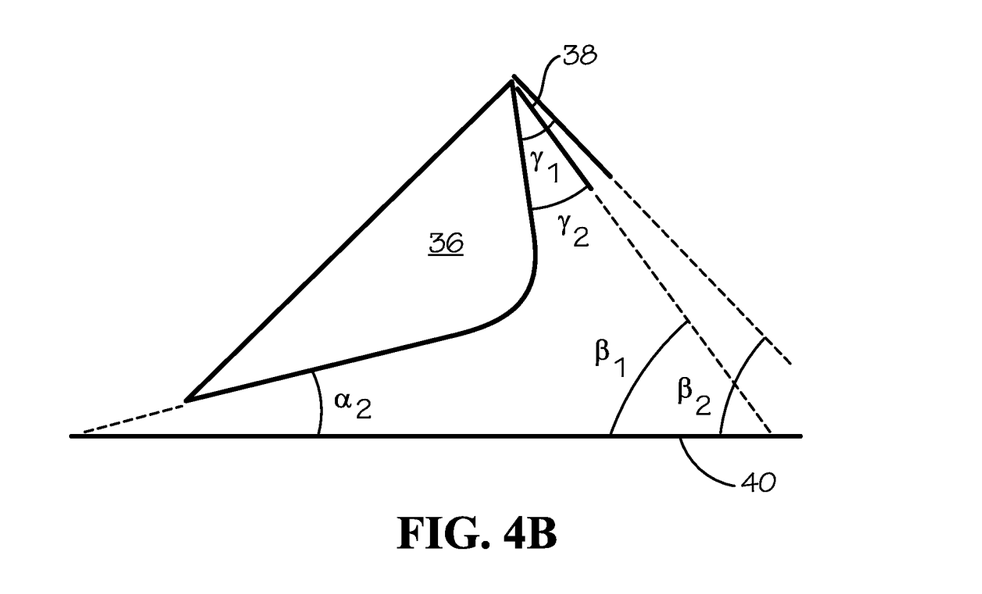

Referring to FIG. 4A, shown is an original, desired configuration of the header 36, with angles $\alpha_1$, $\gamma_1$, and $\beta_1$. In FIG. 4B, the header 36 is tilted (e.g., via the operator selecting a switch to activate the tilt cylinder/control valve combination described previously), such as to adapt to field conditions, resulting in a transition from one angle, $\alpha_1$, to a different angle, $\alpha_2$. The computing system actuates the actuator 34 to control the swathboard 38 based on receiving information about the change in header tilt and the current swathboard position, resulting in a change from $\gamma_1$ to $\gamma_2$, which maintains the angle ($\beta_1$) of the swathboard 38 constant or substantially constant relative to ground, or stated otherwise, to maintain the position of the swathboard 38 constant in the absolute coordinate system (and change the position in the local coordinate system). The angles, $\gamma_1$ and $\beta_2$, show how a conventional operation would work, with the change in position of the swathboard 38 in the absolute coordinate system, as reflected by $\beta_2$, while maintaining its position as constant in the local coordinate system (as reflected by its constant position $\gamma_1$). In one embodiment, the computing system accesses a data structure with values of target swathboard positions or angles, $\gamma$, according to machine geometry, for values of header tilt based on the current swathboard position or angle. For instance, a sensed or received change in header tilt causes the computing system to determine the target swathboard angle based on machine geometry, and based on the current sensed position of the swathboard 38, compute the adjustment based on the difference between the current swathboard position and the target position, translate the adjustment into an actuation of the actuator 30 (e.g., linear rod displacement), and signal the actuator 30 accordingly to adjust the swathboard position. Although described based on the use of a data structure associating header tilt angles (or changes in angles) to a swathboard position angle ($\gamma$) determined from machine geometry, in some embodiments, the aforementioned computations may be achieved algorithmically (e.g., using basic trigonometric equations). Somewhat similarly, and referring now to FIG. 4C, the header 36 is tilted even further in this example (e.g., via the operator selecting a switch to activate the tilt cylinder/control valve combination described previously), resulting in a transition from one angle, $\alpha_1$, to a different angle, $\alpha_3$, where $\alpha_3$ is also different than $\alpha_2$. The computing system actuates the actuator 34 to control the swathboard 38 based on receiving information about the change in header tilt and the current swathboard position, resulting in a change from $\gamma_1$ to $\gamma_3$ to maintain the angle ($\beta_1$) of the swathboard 38 constant or substantially constant relative to ground. Stated otherwise, the computing system actuates the actuator 30 to maintain the position of the swathboard 38 constant in the absolute coordinate system by making adjustments in the local coordinate system. In contrast, conventional operation would result in no change in the swathboard angle relative to the header 36 ($\gamma_1$) or in the local coordinate system, while effecting a change in position of the swathboard 38 in the absolute coordinate system, as reflected by $\beta_3$. The mechanisms of control implementation to achieve the results of FIG. 4C are the same as those described in association for FIG. 4B, and hence are omitted here for brevity.

Figure 4C:
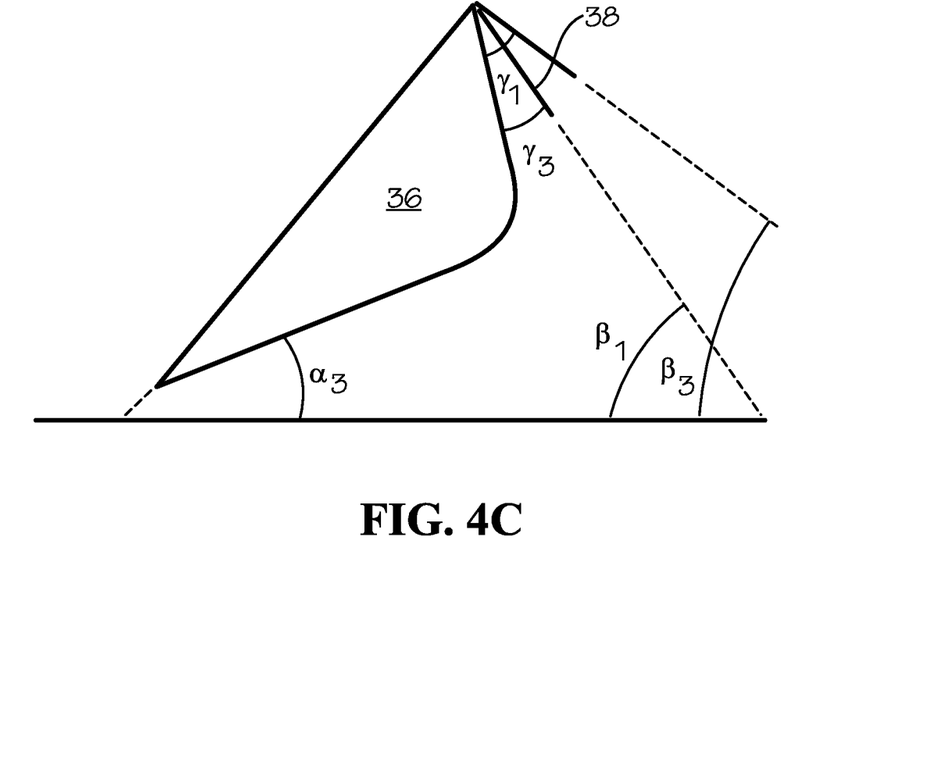

In the examples of FIGS. 4A-4C, one benefit of the swathboard control system is the achievement of a consistent windrow width, especially through avoidance of the non-linear transition described above (e.g., transition from crop material not hitting the forming shield 22 to suddenly, as a result of header tilt, hitting the forming shields 22, possibly resulting in a narrower and taller windrow). As described above, receipt/sensing of header tilt information and sensed swathboard information enables updates to $\gamma$ that are based in part on machine geometry to maintain a constant swathboard position in the absolute coordinate system.

Figure 5A:
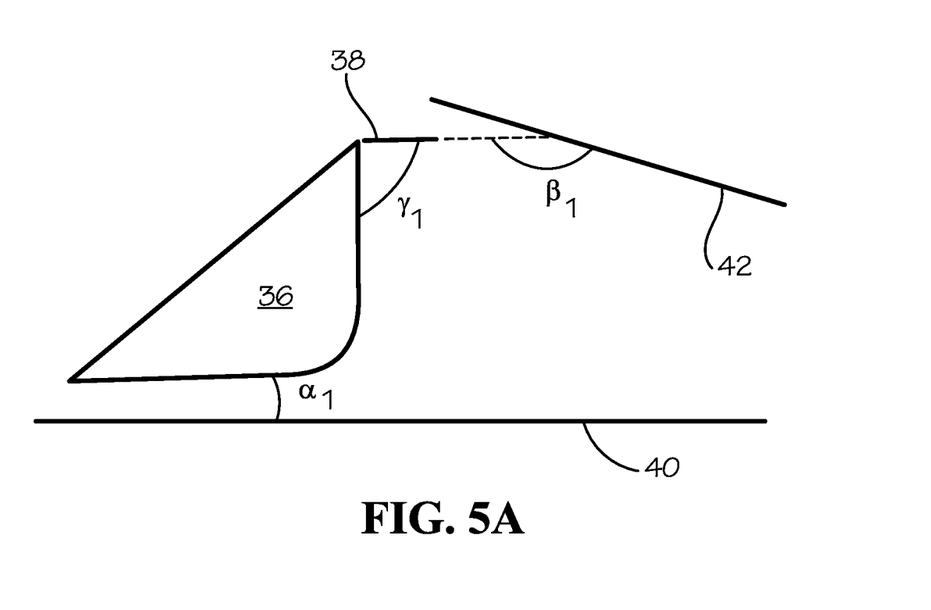
FIGS. 5A-5C are schematic diagrams that conceptually illustrate control of positioning of the swathboard with respect to the forming shields in an embodiment of a swathboard control system.
Figure 5B:
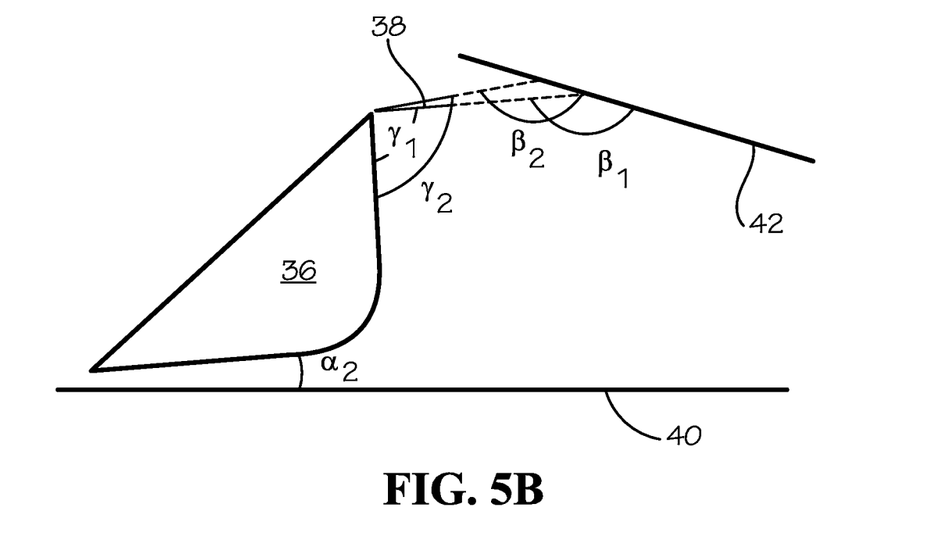
Figure 5C:
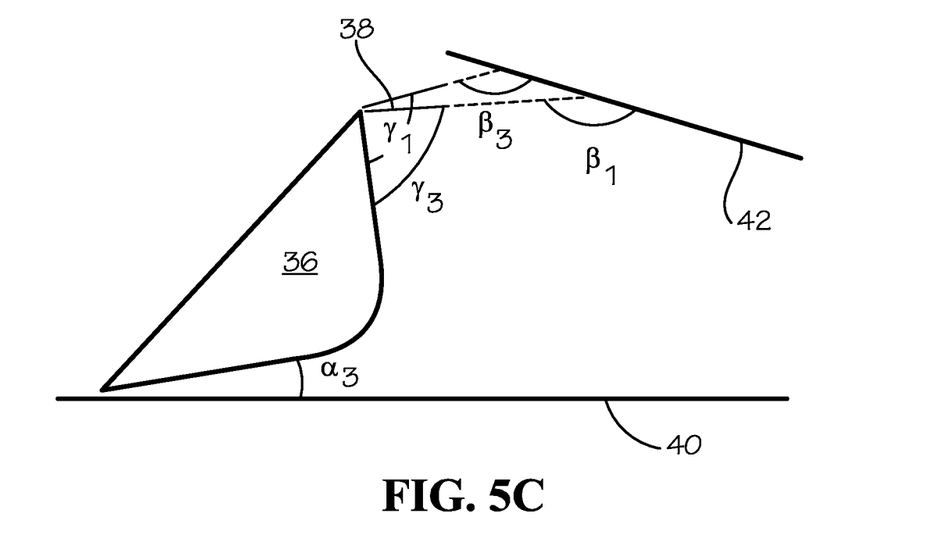

Referring now to FIGS. 5A-5C, a similar conceptual visualization as that shown in FIGS. 4A-4C is used, illustrating control of positioning of the swathboard relative to forming shields in an embodiment of a swathboard control system. FIGS. 5A-5C still illustrate the same control mechanisms described for FIGS. 4A-4C, yet may provide benefits over conventional systems for different reasons. Similar to FIGS. 4A-4C, shown are representations of a header 36, swathboard 38, and the ground 40, and the addition of one or more forming shields 42 of a forming shield assembly (which may use one or plural forming shields). Also shown are several angles, including α, γ, and β, where α and γ represent the same angles as those described for FIGS. 4A-4C, yet angle β is now the angle between the swathboard 38 and the forming shield(s) 42 of the forming shield assembly. As with the illustrations in FIGS. 4A-4C, an objective of certain embodiments of a swathboard control system is to maintain the position of the swathboard 38 constant in the absolute coordinate system (and change the position in the local coordinate system), which may be equivalently viewed conceptually in FIGS. 5A-5C as seeking to keep β constant (or substantially constant) for varying values of header tilt (e.g., changes in α) by controlling γ (changes in the local coordinate system).

Referring to FIG. 5A, shown is an original, desired configuration of the header 36, with angles $α_1$, $γ_1$, and $β_1$. In FIG. 5B, the header 36 is tilted (e.g., via operator input), resulting in a transition from one angle, $α_1$, to a different angle, $α_2$. The computing system actuates the actuator 34 to control the swathboard 38 based on receiving information about the change in header tilt and the current swathboard position, resulting in a change from $γ_1$ to $γ_2$ and maintaining the angle ($β_1$) between the swathboard 38 and the forming shield(s) 42 constant or substantially constant. For instance, similar to the control scheme described in association with FIGS. 4A-4C, a sensed or received change in header tilt causes the computing system to determine the target swathboard angle based on machine geometry, and based on the current sensed position of the swathboard 38, compute the adjustment based on the difference between the current swathboard position and the target position, translate the adjustment into an actuation of the actuator 30 (e.g., linear rod displacement), and signal the actuator 30 accordingly to adjust the swathboard position. Although described based on the use of a data structure associating header tilt angles (or changes in angles) to a swathboard position angle (γ) determined from machine geometry, in some embodiments, the aforementioned computations may be achieved algorithmically (e.g., using basic trigonometric equations as described above). Without the implementation of the swathboard control system, the angle between the swathboard 38 and the header 36 (γ) remains unchanged (i.e., $γ_1$), resulting in the crop material deflected from the swathboard having an impact point associated with angle, $β_2$ (e.g., corresponding to an impact point further forward than desired, resulting in possibly a narrower windrow due to unintended impact with the forming shields), instead of $β_1$. Somewhat similarly, and referring now to FIG. 5C, the header 36 is tilted even further in this example (e.g., via operator input), resulting in a transition from one angle, $α_1$, to a different angle, $α_3$, where $α_3$ is also different than $α_2$. The computing system actuates the actuator 30 to control the swathboard 38 based on receiving information about the change in header tilt and the current swathboard position, resulting in a change from $γ_1$ to $γ_3$ and maintaining of the angle ($β_1$) of the swathboard 38 relative to the forming shield(s) 42 constant or substantially constant. Without the implementation of the swathboard control system, the angle between the swathboard relative to the header (γ) remains unchanged (i.e., $γ_1$), resulting in the crop material deflected from the swathboard 38 having an impact point associated with angle, $β_3$ (e.g., corresponding to an impact point further forward than desired), resulting in an even narrower windrow than that corresponding to impact points associated with the desired $β_1$ or the modified $β_2$ of FIG. 5B.

In FIGS. 5A-5C, a benefit to using a swathboard control system is enabling a more uniform windrow shape (and consistent windrow width) by enabling the position of the swathboard in the absolute coordinate system to remain unchanged (e.g., keeping β constant or substantially constant) while varying the swathboard position in the local coordinate system (varying γ). Once the crop material is hitting the forming shields 42, the shields 42 themselves and their settings have a large influence on the final swath width. As that angle changes, the edges of the windrow may become taller than the center or vice versa without the use of a swathboard control system, which can lead to inconsistent dry times for the same windrow.

Figure 6:
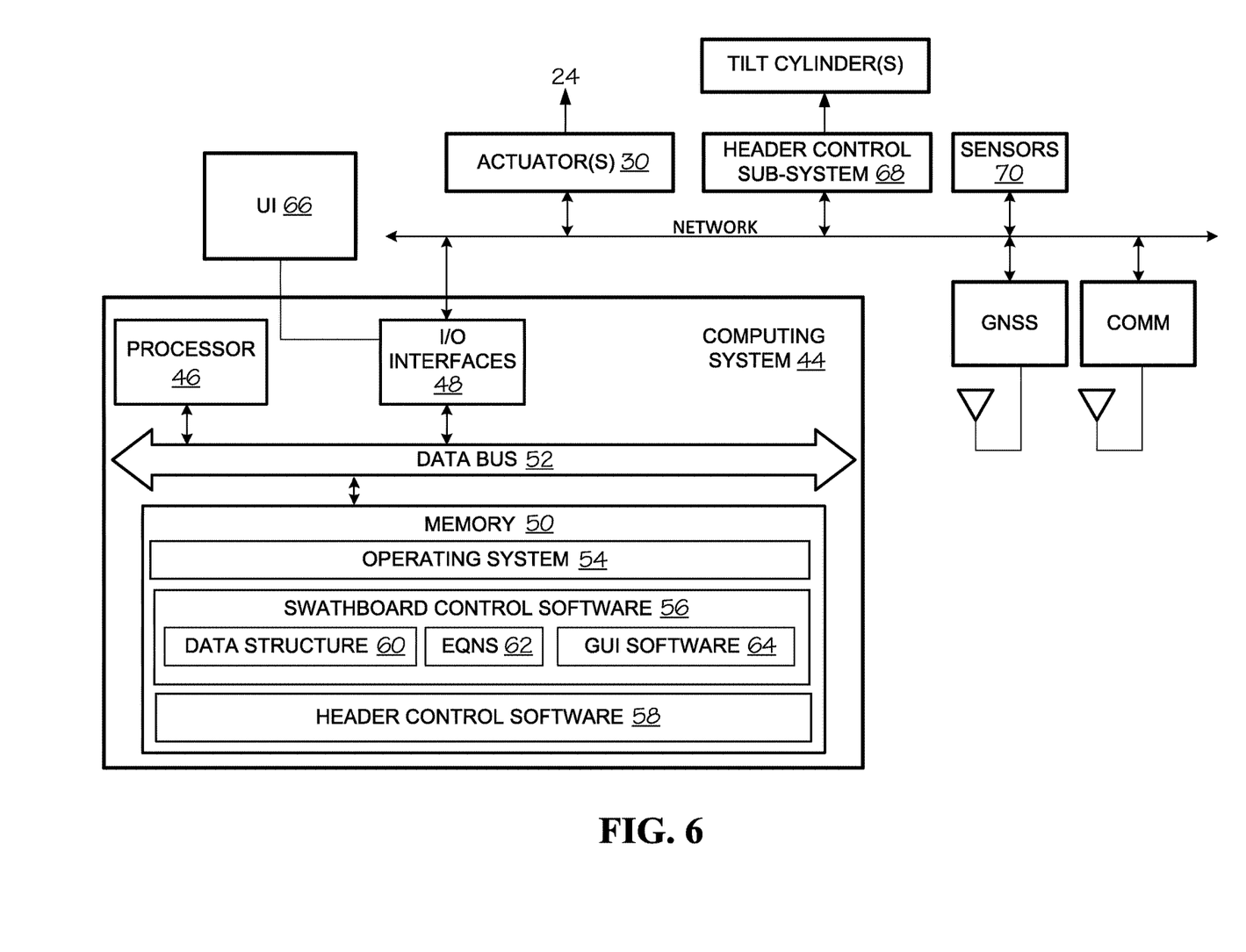
FIG. 6 is a block diagram that illustrates an embodiment of an example computing system and associated network used in an embodiment of a swathboard control system.

Having described certain embodiments of a swathboard control system, attention is directed to FIG. 6, which illustrates an embodiment of an example computing system 44 and associated network. One having ordinary skill in the art should appreciate in the context of the present disclosure that the example computing system 44 is merely illustrative, and that some embodiments of computing systems may comprise fewer or additional components, and/or some of the functionality associated with the various components depicted in FIG. 6 may be combined, or further distributed among additional modules and/or computing devices (e.g., plural ECUs), in some embodiments. It should be appreciated that, though described in the context of residing in the windrower 10 (FIG. 1), in some embodiments, one or more of the functionality of the computing system 44 may be implemented in a computing device or devices located internal to the windrower 10, or internal and external to the windrower 10, or completely external to the windrower 10. The computing system 44 is depicted in this example as a computer device (e.g., an electronic control unit or ECU), but may be embodied as a programmable logic controller (PLC), field programmable gate array (FPGA), application-specific integrated circuit (ASIC), among other devices. It should be appreciated that certain well-known components of computer systems are omitted here to avoid obfuscating relevant features of the computing system 44. In one embodiment, the computing system 44 comprises one or more processors, such as processor 46, input/output (I/O) interface(s) 48, and memory 50, all coupled to one or more data busses, such as data bus 52. The memory 50 may include any one or a combination of volatile memory elements (e.g., random-access memory RAM, such as DRAM, and SRAM, etc.) and nonvolatile memory elements (e.g., ROM, Flash, hard drive, EPROM, EEPROM, CDROM, etc.). The memory 50 may store a native operating system, one or more native applications, emulation systems, or emulated applications for any of a variety of operating systems and/or emulated hardware platforms, emulated operating systems, etc.

In the embodiment depicted in FIG. 6, the memory 50 comprises an operating system 54, swathboard control software 56, and optionally, header control software 58. In one embodiment, the swathboard control software 56 further comprises a data structure 60 (e.g., look up table) and/or equations 62, and graphical user interface (GUI) software 64. In some embodiments, one or more of these components of the swathboard control software 56 may be located elsewhere (e.g., the data structure may be located in a persistent storage device external to memory 50), or omitted (e.g., the data structure 60 may not be used, instead using equations 62, or vice versa). In one embodiment, the data structure 60 comprises a relational data base that associates different, plural header tilts with targeted swathboard positions that are based on machine geometry. For instance, for a received, sensed header tilt, the data structure 60 associates the angles α with a target swathboard position according to machine geometry. Machine geometry that may be used in the aforementioned associations for the data structure 60 (or used in the (trigonometric) equations 62) include header connection points to the tractor and the distance between them, the length of the tilt cylinder, the position of the header axis of rotation when being tilted, and the location of the swathboard axis of rotation. The processor 46 executes instructions (executable code) of the swathboard control software 56 to use the current sensed position of the swathboard 38 to compute the swathboard position adjustment based on the difference between the current swathboard position and the target position, translate the adjustment into an actuation of the actuator 30 (e.g., linear rod displacement), and signal the actuator 30 accordingly to adjust the swathboard position. In effect, the control software 56 uses the inputted header tilt and swathboard position and the data structure 60 to control γ (via actuation of actuator 30) for varying α to maintain the swathboard position in an absolute coordinate system constant or substantially constant as described in association with FIGS. 4A-5C. In some embodiments, as explained above, the processor 46 may execute (trigonometric) equations 62 that provide the same or similar functionality to achieve the same result or similar to that obtained using the data structure 60. For instance, the equations 62 (e.g., using the law of sines/cosines to determine angles, lengths, distances) enable the determination of how much the local coordinate system origin (the axis of rotation of the swathboard) translates as well as rotates. The GUI software 64 provides a GUI on a user interface 66 (e.g., display screen) of, for instance, a cab monitor, that visually presents an indication of the received swathboard position value (e.g., from sensor 34) to the operator. As described previously, the indication of swathboard position may be the angular value of the swathboard position, or an index value corresponding to the angular value (e.g., ranging from 1-10, for instance), or a derived parameter such as windrow width. In some embodiments, the swathboard control software 56 may comprise text to audio functionality to convert the received swathboard position value to audio to enable audible feedback of the swathboard position via speaker functionality of the user interface 66 at the operation station or via a headset worn by the operator. Note that the GUI software 64 is optional, and that in some embodiments, feedback to an operator of the swathboard position (e.g., the indicator of the swathboard position) may be transparent to the operator, wherein the swathboard control software 56 uses the swathboard position to index an entry in the data structure 60 (or input to the equations 62) to derive a control variable to use to communicate to the actuator 30 without operator intervention and/or awareness (or in some embodiments, alerting the operator to enable the operator to override the change).

The header control software 58 comprises executable code that receives, among other input, a header tilt command (or other tilt information) and feedback of current header tilt position (e.g., communicated from or access from a sensor or controller associated with tilt control, or via translation of a switch position or depressed-duration and direction to the header tilt), and communicates a signal or signals to a header control sub-system 68 (e.g., manifold of control valves with or without the addition of another controller) that in turn change the hydraulic fluid flow to one or more hydraulic actuators (tilt cylinders) to tilt the header 14 (FIG. 1). In some embodiments, functionality of the header control software 58 may be embodied in another controller, and header tilt information is communicated by the controller to the swathboard control software 56.

In some embodiments, functionality of the swathboard control software 56 may be distributed among plural devices within the windrower 10, or provided all or in part at a remote device (e.g., server device that is located external from the windrower 10 and in wireless (e.g., cellular, Wi-Fi, radio-frequency, etc.) communication with the windrower 10).

It should be appreciated that in some embodiments, additional modules (e.g., browser, or if swathboard control software functionality is located remotely, web-host network software, guidance software, communications software, etc.) or fewer software modules (e.g., combined functionality, omitted functionality) may be employed (or omitted) in the memory 50 or used in additional memory. In some embodiments, a separate storage device may be coupled to the data bus 52 (or to a CAN bus (depicted in FIG. 6 as NETWORK, including a CAN system, such as a network in conformance to the ISO 11783 standard, also referred to as "Isobus) or other network via I/O interfaces 48), such as a persistent memory (e.g., optical, magnetic, and/or semiconductor memory and associated drives).

Execution of the swathboard control software 56 (among other software of the computing system 44) may be implemented by the processor 46 under the management and/or control of the operating system 54. The processor 46 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the computing system 44.

The I/O interfaces 48 provide one or more interfaces to the CAN bus (NETWORK) and/or other networks. In other words, the I/O interfaces 48 may comprise any number of interfaces for the input and output of signals (e.g., comprising analog or digital data) for conveyance of information (e.g., data) over one or more networks. The input may comprise input by an operator (local or remote) through the user interface 66, which may include switches, touch-screen, FNR joystick, etc., and/or controllers from the cab or from other locations on the windrower 10 (including the header 14) of FIG. 1, input from sensors 70 (e.g., position sensor 34, sensors to determine header tilt, etc.), input from communications components (COMM) on the CAN or other network (e.g., radio modem, cellular modem, etc.), input from GNSS (global navigation satellite systems) components (e.g., a GNSS receiver) coupled to the CAN or other network, input from storage devices (e.g., memory, removable storage, persistent storage, etc.) coupled to the CAN or other network, among other devices. The user interface 66 includes one or any combination of a keyboard, joystick (e.g., with tactile motor), steering wheel, headset, immersive headset, mouse, microphone/speaker, display screen, touch-type or otherwise, among other types of input devices. Outputs may include signals to actuate the actuator 30 and/or other devices (e.g., of the header control sub-system 68).

When certain embodiments of the computing system 44 are implemented at least in part as software (including firmware), as depicted in FIG. 6, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the computing system 44 are implemented at least in part as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 7:
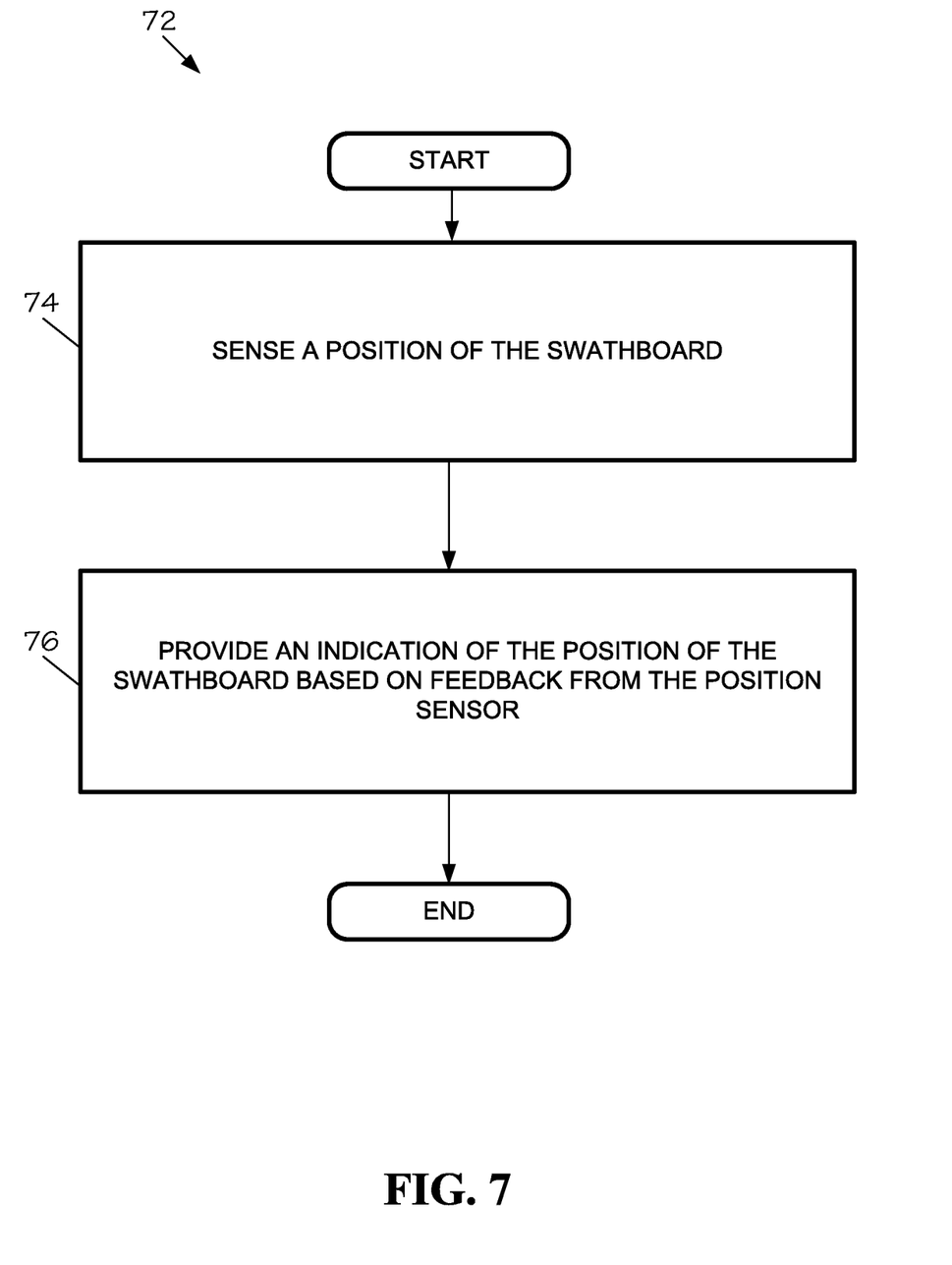
FIG. 7 is a flow diagram that illustrates an embodiment of an example swathboard control method.

In view of the above description, it should be appreciated that one embodiment of an example swathboard control method 72, depicted in FIG. 7 (and implemented in one embodiment by the computing system 44 and one or more other components depicted in FIG. 6), comprises sensing a position of the swathboard (74); and providing an indication of the position of the swathboard based on feedback from the position sensor (76).

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

Note that reference to the swathboard position remaining the same or substantially similar, and/or the angle between the swathboard and the ground or forming shield assembly being constant or substantially constant, and the like, refers to the fact that in some embodiments, the swathboard position and/or angle may be controlled to remain in the same position and/or same angle, respectively, in the absolute coordinate system, or that in some embodiments, the swathboard position and/or angle may be controlled to remain in a substantially similar position and/or substantially constant angle, respectively, in the absolute coordinate system, wherein the terms similar and substantially constant convey an amount of deviation from what would be the same swathboard position and from what would be the constant angle, respectively. In one embodiment, the amount of deviation may be measured in tenths of a degree. In some embodiments, the amount of deviation may be measured in integer degrees. In some embodiments, the amount of deviation may be in the range ±10 degrees.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Although the control systems and methods have been described with reference to the example embodiments illustrated in the attached drawing figures, it is noted that equivalents may be employed and substitutions made herein without departing from the scope of the disclosure as protected by the following claims.

At least the following is claimed:

1. A swathboard control system, comprising:
a header comprising a cutting assembly and a conditioning system aft of the cutting assembly;
a forming shield assembly;
a swathboard located between the conditioning system and the forming shield assembly, the swathboard pivotably adjustable about a transverse axis;
a position sensor configured to sense a position of the swathboard; and
a computing system operably coupled to the position sensor, the computing system configured to provide an indication of the position of the swathboard based on feedback from the position sensor.

2. The swathboard control system of claim 1, further comprising an actuator operably coupled to the swathboard, wherein the position sensor is configured to sense the position of the swathboard indirectly by detecting a position of a moving component of the actuator.

3. The swathboard control system of claim 1, wherein the position sensor is configured to directly sense the position of the swathboard.

4. The swathboard control system of claim 1, further comprising a user interface, wherein the computing device is further configured to present the indication via the user interface.

5. The swathboard control system of claim 4, wherein the user interface is configured to provide a visual indication, an audible indication, or a combination of visual and audible indications.

6. The swathboard control system of claim 1, further comprising an actuator operably coupled to the swathboard, wherein the computing system is further configured to receive an indication corresponding to a change in tilt of the header and automatically control the position of the swathboard based on the received tilt indication and the feedback from the position sensor.

7. The swathboard control system of claim 6, wherein the computing system is further configured to control the position of the swathboard by adjusting via the actuator an angle of the swathboard relative to the header as the tilt of the header is changed while maintaining the swathboard in a same or substantially similar position in an absolute coordinate system.

8. The swathboard control system of claim 6, wherein the computing system is further configured to control the position of the swathboard by adjusting via the actuator an angle of the swathboard relative to the header to update the angle based on machine geometry and the changing tilt of the header, wherein an angle between the swathboard and the forming shield assembly remains constant or substantially constant.

9. A method implemented in a harvesting machine comprising a header, a swathboard, and a forming shield assembly, the method comprising:

sensing a position of the swathboard with a position sensor; and providing an indication of the position of the swathboard based on feedback from the position sensor.

10. The method of claim 9, wherein sensing comprises sensing the position of the swathboard indirectly by detecting a position of a moving component of an actuator coupled to the swathboard.

11. The method of claim 9, wherein sensing comprises directly sensing the position of the swathboard.

12. The method of claim 9, further comprising presenting the indication via a user interface.

13. The method of claim 12, wherein presenting comprises presenting visually, audibly, or a combination of visually and audibly.

14. The method of claim 9, further comprising receiving an indication corresponding to a change in tilt of the header and automatically controlling the position of the swathboard with an actuator based on the received tilt indication and the feedback from the position sensor.

15. The method of claim 14, wherein controlling the position of the swathboard comprises adjusting via the actuator an angle of the swathboard relative to the header as the tilt of the header is changed while maintaining the swathboard in a same or substantially similar position in an absolute coordinate system.

16. The method of claim 14, wherein controlling the position of the swathboard comprises adjusting via the actuator an angle of the swathboard relative to the header to update the angle based on machine geometry and the changing tilt of the header, wherein an angle between the swathboard and the forming shield assembly remains constant or substantially constant.

17. A non-transitory computer readable medium encoded with instructions that cause at least one processor to:

receive a sensed position of a swathboard for a harvesting machine; and provide an indication of the position of the swathboard based on the received sensed position.

18. The non-transitory computer readable medium of claim 17, wherein the instructions further cause the at least one processor to present the indication via a user interface.

19. The non-transitory computer readable medium of claim 17, wherein the instructions further cause the at least one processor to receive an indication corresponding to a change in tilt of the header and automatically control the position of the swathboard based on the received tilt indication and the received sensed position.

20. The non-transitory computer readable medium of claim 19, wherein the instructions further cause the at least one processor to control by any one or a combination of:

adjusting via an actuator an angle of the swathboard relative to the header as the tilt of the header is changed while maintaining the swathboard in a same or substantially similar position in an absolute coordinate system, wherein an angle between the swath board and the forming shield assembly remains constant or substantially constant.

* * * * *